(12) United States Patent
Gerhardt et al.

(10) Patent No.: US 7,039,179 B1
(45) Date of Patent: May 2, 2006

(54) ECHO REDUCTION FOR A HEADSET OR HANDSET

(75) Inventors: John F. Gerhardt, Los Gatos, CA (US); J. Stephen Graham, Scott's Valley, CA (US); Robert M. Khamashta, Los Gatos, CA (US); Iain McNeill, Aptos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 552 days.

(21) Appl. No.: 10/256,450

(22) Filed: Sep. 27, 2002

(51) Int. Cl.
*H04M 1/00* (2006.01)

(52) U.S. Cl. ............................ 379/390.02; 379/387.01; 379/93.05; 379/390.04

(58) Field of Classification Search ............ 379/387.01, 379/93.05, 390.02, 390.04
See application file for complete search history.

(56) References Cited

U.S. PATENT DOCUMENTS 5,619,508 A * 4/1997 Davis et al. ............. 379/93.08

* cited by examiner

*Primary Examiner*—Jefferey F. Harold
(74) *Attorney, Agent, or Firm*—David Park

(57) ABSTRACT

The present invention provides an echo reduction apparatus, system, and method that advantageously reduces echo when communicating over packet-switched networks. An echo reduction apparatus, including echo reduction circuit, operably couples a headset or handset device to an audio source that is capable of transmitting a sound signal. The echo reduction circuit receives the sound signal from the audio source and a transmit signal from the headset or handset device and provides an adjusted sound signal to the audio source. Advantageously, a variety of headsets and handsets may be used in accordance with the present invention with reduced caller echo and without the need to purchase new headsets or handsets.

19 Claims, 4 Drawing Sheets

ECHO REDUCTION FOR A HEADSET OR HANDSET

BACKGROUND

1. Field of the Invention

This invention generally relates to an apparatus, system, and method for improved telephony and, more particularly, to an apparatus, system, and method for reducing or eliminating echo when communicating over packet-switched telephone connections.

2. Description of Related Art

Digital circuit switches have traditionally been used to route voice traffic and low-throughput data traffic but advances in electronics have made packet-switched digital connections, such as Voice over Internet Protocol, increasingly cost-effective.

Circuit switches traditionally provided a physical, dedicated path, called a time slot, for a call when it went through the switching matrix. Because this path was dedicated to the call, no other callers could use the selected switch path until the call ended. This concept of a dedicated path guaranteed high-quality, almost error-free transmission for the call.

Packet switches, in contrast, do not use dedicated paths, but evolved in the 1970s to handle the variable bit rates of data transmission bursts. Packet switches take a user's data stream, break it down into smaller segments, called packets, add network control information, and then transmit the packets through the network in bursts. When a burst of data comes in, switching resources are assigned for that burst, with the resources being shared on an as-needed, first-come, first-served basis. At the end of the burst of data, the resources are available for the next burst of data.

The steady rise in signal processing power, memory capacity, operating speed, and error correction has allowed packet-switched networks to handle the real-time demands of voice traffic. With the huge increase of Internet users and data transmissions over communication networks in the past several years, telecommunication companies and Internet providers are moving to route both voice and data traffic, as well as Internet traffic, over packet-switched networks.

A disadvantage of packet-switched networks has been that the amount of real-time processing required to control the packets has been enormous. Accordingly, the real-time processing has introduced a certain amount of delay in moving a packet through the network. Thus, packet-switched connections necessarily add a perceptible amount of delay to signal transmission, while traditional circuit-switched connections do not create perceptible delay since a path remains fixed once a call is set up. This delay makes objectionable even a small amount of coupling of the received voice signal into the transmitted signal, which causes a caller to hear an echo of his/her own voice. Most callers find such an echo, even one that is not loud, to be distracting and annoying.

Telephone headsets commonly couple more of the received signal into the transmitted signal than is optimal for modern, packet-switched connections. Similarly, many handsets in use today were not designed with the requirements of packet-switched telephony in mind, and therefore couple more of the received signal into the transmitted signal than is optimal.

Different methods have been used to reduce echo associated with telephones. One method has been to change the mechanical and acoustic characteristics of the headset to reduce coupling between the receive signal and the transmit signal. Disadvantageously, this method requires compromising other desirable characteristics of the headset, such as wearing comfort, weight, small size, and low cost. Furthermore, this method requires the owner of an existing headset to purchase a new one.

A second method has been to suppress undesired echoes using equipment or software within the telephone network between the telephones in use. This method has included either digital hardware or digital signal processing software built into the network equipment to help solve the fundamental delay problems for stream voice, video, or raw data. Unfortunately, network echo reduction equipment is commonly optimized for handling echoes that originate within the network, whose characteristics remain relatively constant for the duration of a single call. However, the undesired signal coupling in a headset or handset can vary rapidly during a call, since small movements of the user can affect the coupling. This rapid variation greatly reduces the effectiveness of network echo reduction equipment. Accordingly, such network equipment cannot accommodate the complex characteristics of the adjuncts connected to the user side of these gateways or packet-switched networks.

A third method has been to suppress undesired echoes using equipment designed into the telephone itself. However, many phones in use today lack such means to reduce the echo caused by undesired coupling. Furthermore, when the user attempts to use a telephone headset or a telephone handset which is different from that provided with the telephone originally, the caller can hear undesirable echo.

Therefore, there is a need for an apparatus, system, and method that allows for a reduction in echo when using a variety of headsets and handsets in conjunction with packet-switched networks without having to purchase new headsets or handsets.

SUMMARY

The present invention provides echo reduction circuit between a headset or handset device and an audio source to advantageously reduce or suppress caller echo associated with packet-switched networks.

In one embodiment of the present invention, an echo reduction apparatus is provided, comprising a first connection interface capable of operably coupling a headset or handset device to the echo reduction apparatus, a second connection interface capable of operably coupling an external audio source to the echo reduction apparatus, and an echo reduction circuit operably coupled to the first and second connection interfaces. The echo reduction circuit is capable of receiving a sound signal from the audio source, comparing the sound signal from the audio source to a sound signal from the headset or handset device, and providing an adjusted sound signal to the audio source.

In another embodiment of the present invention, an echo reduction system is provided, comprising an audio source that is capable of transmitting a sound signal, a headset or handset device operably coupled to the audio source, wherein the headset or handset device is capable of transmitting a sound signal, and an echo reduction apparatus operably coupled between the audio source and the headset or handset device.

In yet another embodiment of the present invention, a method of reducing echo is provided, comprising providing an echo reduction circuit operably coupled between a headset or handset device and an audio source, transmitting a sound signal from the audio source to the echo reduction circuit, comparing the sound signal from the audio source to a sound signal from the headset or handset device, adjusting the sound signal from the headset or handset device as necessary, and transmitting the adjusted sound signal to the audio source.

Advantageously, the present invention allows for a reduction in echo when using headsets and handsets that do not meet the stringent receive-transmit coupling requirements of packet-switched telephony.

These and other features and advantages of the present invention will be more readily apparent from the detailed description of the embodiments set forth below taken in conjunction with the accompanying drawings.

BRIEF DESCRIPTION OF THE DRAWINGS

Use of the same reference symbols in different figures indicates similar or identical items.

DETAILED DESCRIPTION

The present invention provides an echo reduction apparatus, including echo suppression or cancellation circuit operably connected to a headset or handset device to advantageously reduce or prevent caller echo that would otherwise occur through a packet-switched network (e.g., the Internet).

Figure 1:
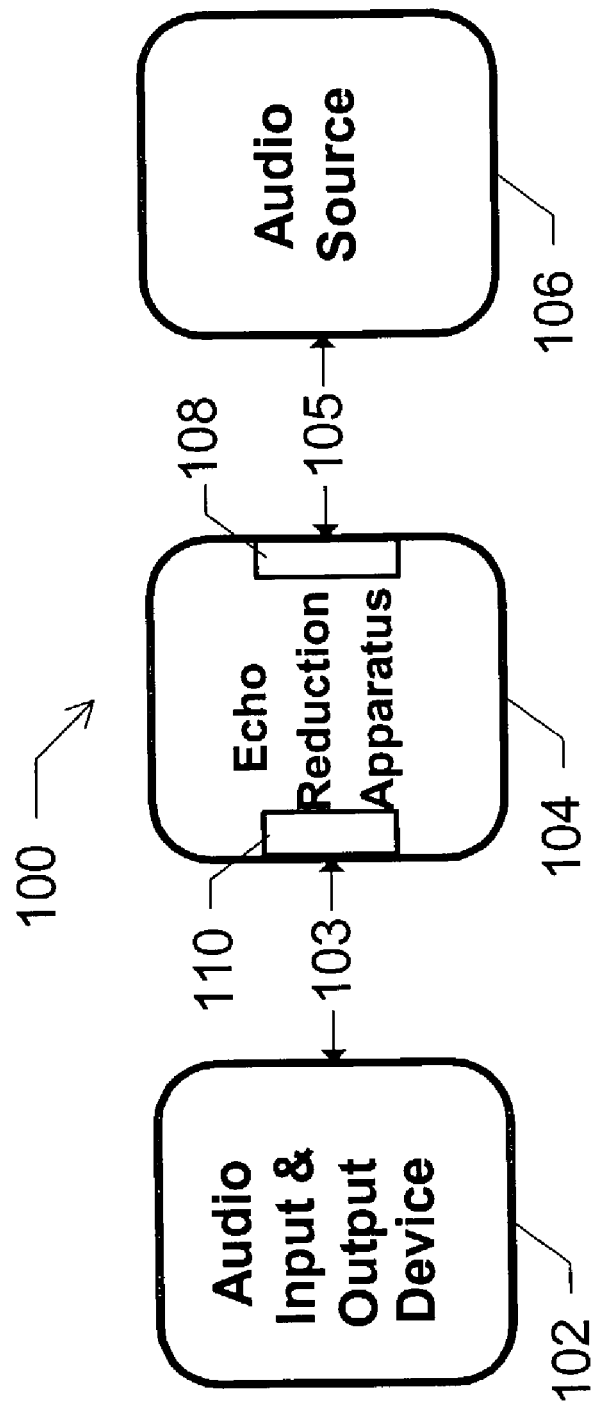
FIG. 1 shows a block diagram of an echo reduction system in accordance with an embodiment of the present invention.

FIG. 1 shows a simplified block diagram of an echo reduction system 100 in accordance with one embodiment of the present invention. In this embodiment, an audio source 106 is operably connected to an echo reduction apparatus 104, which receives an input audio signal along lead 105 from audio source 106. The present invention is not limited to a specific audio source 106 and may receive an audio signal from any applicable audio signal source, for example, a communications network, a computer, a telephone, a cellular telephone, or any other host telephony apparatus. As an example, with no intent to limit the invention thereby, a communications network may include a public switched telephone network (PSTN), an integrated services digital network (ISDN), a local area network (LAN), and/or a wireless local area network (WLAN), with standards such as Ethernet, wireless fidelity (WiFi), and/or voice over internet protocol (VoIP).

An audio input/output device 102 is also operably connected to echo reduction apparatus 104 via lead 103. Audio input/output device 102 includes speaker (or earphone) and microphone transducers and is capable of sending a sound signal to echo reduction apparatus 104 along lead 103. It is noted that echo reduction apparatus 104 may be added in plurality to match any number of earphones and associated leakage paths. It is further noted that audio input/output device 102 may also include multiple microphones, and in such a situation, a plurality of echo reduction apparatus 104 could also be beneficial.

Echo reduction apparatus 104 includes echo suppression and/or cancellation circuit in one embodiment that receives signals from audio source 106 and from audio input/output device 102, compares the signals, and provides an adjusted signal to audio source 106 in order to reduce or cancel echo.

Echo reduction apparatus 104 also acts as an adapter to enable compatibility between audio source 106 and audio input/output device 102, such as a headset or handset device. In one example, echo reduction apparatus 104 includes connection interfaces 108 and 110 to allow for operable coupling between audio source 106 and echo reduction apparatus 104 and between echo reduction apparatus 104 and audio input/output device 102, respectively, thereby allowing for operable coupling between audio source 106 and audio input/output device 102. Connection interfaces 108 and 110 may include plugs, headset or handset jacks, cables, cords, and any other applicable connecting or adaptive means in accordance with the present invention. It is noted that echo reduction apparatus 104 may act as an adapter to fit a wide range of headset or handset device and/or a wide range of audio sources. An example of a structure suitable for use in the present invention, with no intent to limit the invention thereby, is Vista™ Universal Amplifier Model M12, available from Plantronics®, Inc., located in Santa Cruz, Calif.

Figure 2:
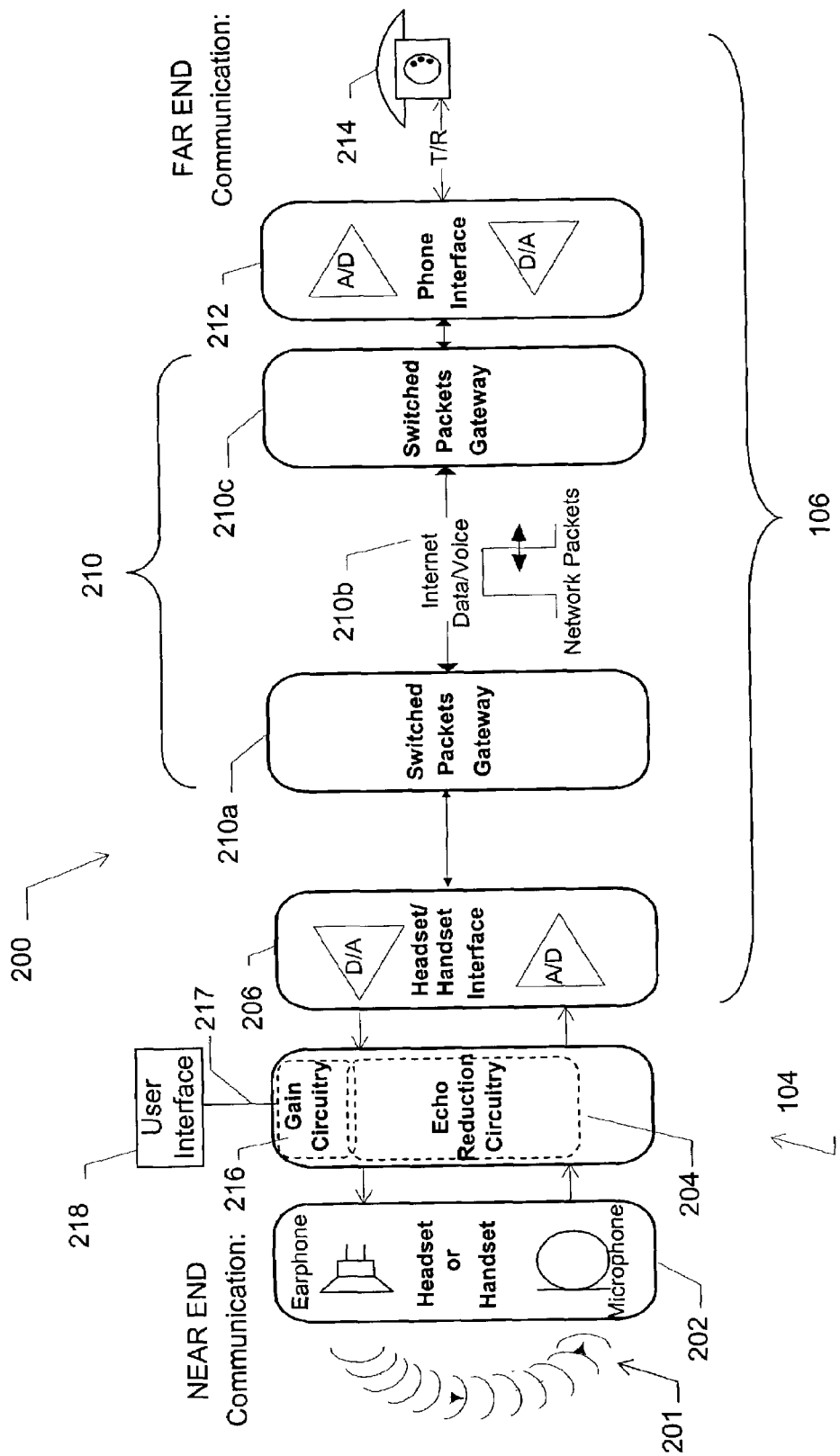
FIG. 2 shows a block diagram of an echo reduction system applied in a detailed example of an end-to-end communication system, in accordance with another embodiment of the present invention.

FIG. 2 shows a detailed block diagram of an echo reduction system 200 in an example of a complete end-to-end telecommunication application, in accordance with another embodiment of the present invention. An exemplary embodiment of audio input/output device 102 is a headset or handset device 202 that includes an earphone transducer and a microphone transducer. Headset or handset device 202 converts the received audio signal from audio source 106 to an acoustic signal to be heard by the headset or handset device user. Any signal leakage, either internal or external to headset or handset device 202, is represented by leakage path 201. Leakage path 201 represents earphone activity (acoustic and/or electromechanical) that is undesirably coupled to the microphone and transmitted from headset or handset device 202. It is noted that the user's face, ears, and/or mouth can interact with the headset/handset apparatus to modify the magnitude and frequency response of the unwanted leakage signal, whether purely acoustic, electromechanical, or a combination of both.

As noted above, several different versions of headset or handset device 202 may be used in conjunction with echo reduction apparatus 104 to give the user a choice of headset or handset device to wear or use. Headset or handset device 202 can include any adaptable headset apparatus such as the Encore™ series commercially available from Plantronics®, Inc., located in Santa Cruz, Calif.

Typically, leads 103 and 105 (FIG. 1) are analog in nature and require 4 wires: 2 wires for the receive signal paths and 2 wires for the transmit signal paths, as shown in FIG. 2. In accordance with one embodiment of the present invention, headset or handset device 202 is operably connected to echo reduction apparatus 104 including echo reduction circuit 204, as illustrated in FIG. 2. A user interface 218 may also be optionally included with echo reduction apparatus 104 and specifically is connected to gain circuit 216 through lead 217. User interface 218 allows the user to manually adjust the gain of the receive signal being heard through headset or handset device 202.

Echo reduction circuit 204 is operably connected to audio source 106, such as a host telephony system, as shown in FIG. 2. In this example, audio source 106 is comprised of a headset/handset interface 206, such as a telephone or communication terminal, a packet-switched network 210 including gateways 210a and 210c and pathway 210b, a phone interface 212, and a telephone 214. Many other combinations of telephone technology may be involved at either end of the telecommunication link shown in FIG. 2, but common elements will involve packet-switched network 210, which are the gateways and pathways that join digital and/or analog (e.g., PSTN) telephone systems together.

Accordingly, the far end user of telephone 214 can experience an echo of his/her own voice delayed in time, the severity of which is dictated by the acoustic and mechanical isolation limitations of headset or handset device 202 (i.e., the signal leakage path 201), overall network signal gain, and the total amount of fixed and/or varying packet switching delay through network 210. Advantageously, echo reduction apparatus 104 reduces this echo by utilizing echo reduction circuit between headset or handset device 202 and audio source 106, as described in greater detail below.

Figure 3A:
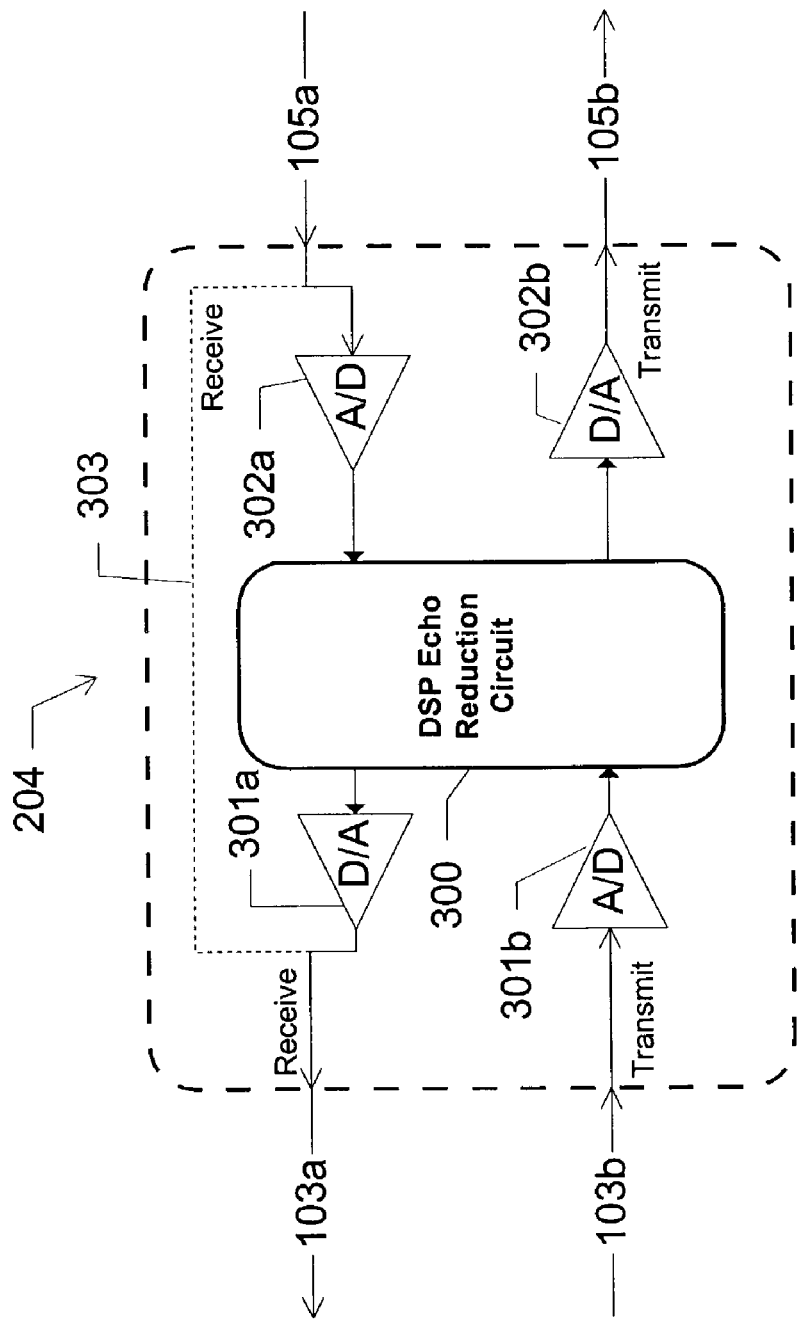
FIG. 3A shows a block diagram of an echo reduction apparatus including one example of echo reduction circuit in accordance with an embodiment of the present invention.

FIG. 3A shows a block diagram of some of the electrical components that are included in one example of echo reduction circuit 204. In one example of a receive path from audio source 106 (FIGS. 1 and 2), echo reduction circuit 204 may include an analog-to-digital (A/D) converter 302a to receive an analog input audio signal along lead 105a from audio source 106 (FIG. 1). A/D converter 302a converts the signal into a digital signal for processing by digital signal processor (DSP) 300. A/D converter 302a may be any suitable means for decoding and digitizing analog audio signals.

As further shown in FIG. 3A, the digital signal from DSP 300 may be sent to a digital-to-analog (D/A) converter 301a for conversion of the digital signal to an analog signal. D/A converter 301a may be any suitable device for converting digital audio signals to analog audio signals. Finally, the analog signal is sent along lead 103a to headset or handset device 202 (FIG. 2), where it is converted into an acoustic signal which is heard by the user.

Alternatively, since the incoming receive signal needs only to be monitored or sampled by the processor, A/D converter 302a can monitor the receive signal along lead 105a, and lead 303 (shown by dashed lines) could be used to bypass any conversion and signal processing on the receive signal. Thus, D/A converter 301a could be omitted in this example.

Similarly, in another embodiment, headset or handset device 202 (FIG. 2) may receive digital signals. After DSP 300 samples the digitized input signal, or the digital signal is directly sent to headset or handset device 202 (FIG. 2), the digital signal may be converted into an acoustic signal by headset or handset device 202 (FIG. 2) which is heard by the user. Again, D/A converter 301a may be omitted in this embodiment.

In an example of a transmit path from headset or handset device 202 (FIG. 2), echo reduction circuit 204 may include an analog-to-digital (A/D) converter 301b to receive an analog audio signal along lead 103b from headset or handset device 202 (FIG. 2). A/D converter 301b may be any suitable means for decoding and digitizing analog audio signals. A/D converter 301b converts the signal into a digital signal for delivery to the digital input of DSP 300.

DSP 300 separates the transmit signal (including undesirable leakage signal from insufficient isolation between the earphone and microphone and delay from the packet-switched network) into elements that can be compared with the monitored receive signal delivered to DSP 300 from A/D converter 302a. If measured amounts of receive signal are detected in the transmit signal, then a DSP algorithm will create a correction signal (anti-signal) to remove the detected receive signal from the transmit signal.

Transfer functions, either specific to audio input/output device 102 (FIG. 1) or more generally applicable, may be used to provide frequency and level adjustments to best represent the leakage path characteristics of the audio input/output device 102 (FIG. 1), thereby optimizing determination of the anti-signal to achieve optimum echo reduction. Optionally, table readouts of the transfer function between electrical signal received by the earphone and leakage signal transmitted through the microphone for the range of adaptable headsets or handsets may be used to modify the correction signal. In one example, transfer functions may be determined using laboratory telephone headsets or handsets to monitor signal leakage over frequency and gain.

It is noted that various techniques have been proposed and implemented with telephones and speakerphones in order to address the problem of echoes due to acoustic coupling. These techniques generally fall into categories of echo suppression and echo cancellation. Echo cancellation typically involves calculating an estimated echo signal from the speaker output signal and subtracting the estimated echo signal from the microphone transmit signal, thus generating a corrected transmit signal. Echo suppression, on the other hand, typically involves operating the telephone in half-duplex mode wherein only one path (the receive path or the transmit path) is open at any one time. It is also known to operate the telephone in a quasi-half duplex mode in which neither path is fully closed, but one path may be attenuated more than the other path at any give time. Various forms of DSP echo cancellation and/or suppression algorithms may be used in accordance with the present invention, as will be evident to those of ordinary skill in the art.

Referring again to FIG. 3A, the adjusted digital signal from DSP 300 is then sent to digital-to-analog (D/A) converter 302b for conversion of the digital signal to an analog signal. D/A converter 302b may be any suitable device for converting digital audio signals to analog audio signals. It is noted that A/D converter 302a and D/A converter 302b need not be separate devices but may be combined into a single structure. Similarly, it is noted that D/A converter 301a and A/D converter 301b need not be separate devices but may be combined into a single structure. Finally, the analog signal is sent along lead 105b to audio source 106 (FIGS. 1 and 2) with reduced echo.

Figure 3B:
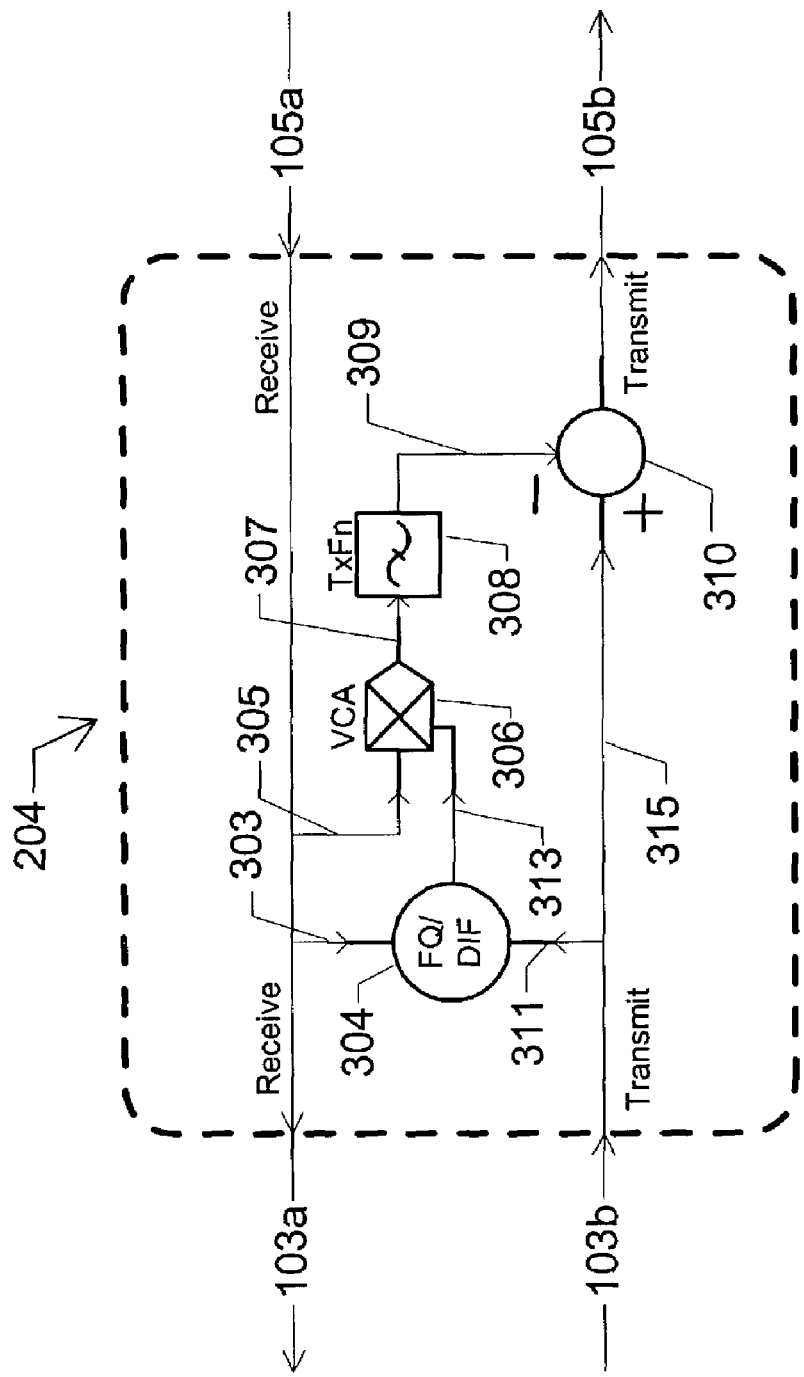
FIG. 3B shows a block diagram of an echo reduction apparatus including another example of echo reduction circuit in accordance with an embodiment of the present invention.

FIG. 3B illustrates another example of echo reduction circuit 204 that may be used in accordance with the present invention to reduce or eliminate echo while communicating through a headset or handset apparatus. In this example, echo reduction circuit 204 includes analog signal processing blocks. Advantageously, this example does not require conversion to the digital domain and thereby eliminates the additional signal delays caused by analog and digital conversions and by the processing latency associated with the DSP. However, this example is not as easily adaptable or programmable in reducing echo as the previously described example illustrated in FIG. 3A.

Referring again to FIG. 3B, a signal is received from audio source 106 (FIGS. 1 and 2) along lead 105a and sent to headset or handset device 202 (FIG. 2) along lead 103a. A frequency difference amplifier 304 receives the receive signal along lead 303 and the transmit signal from headset or handset device 202 (FIG. 2) along lead 311. Frequency difference amplifier 304 provides a comparison of the receive and transmit signals. If the transmit signal matches some of the receive signal, frequency difference amplifier 304 provides a control signal along lead 313 to enable a voltage controlled amplifier (VCA) 306. VCA 306 produces a limited amount of receive signal along lead 307 to be used as a correction signal.

The limited amount of receive signal from VCA 306 is modified by a transfer function 308 either specific to headset or handset device 202 or more generally applicable to a group of headset or handset devices. Transfer function 308 provides frequency and level adjustments to best represent the leakage path characteristics of headset or handset device 202 (FIG. 2) and may be applied by software or hardware. Optionally, table readouts of the transfer function between electrical signal received by the earphone and leakage signal transmitted through the microphone for the range of adaptable headsets or handsets may be used to modify the correction signal. In one example, transfer function 308 may be determined using laboratory telephone headsets or handsets to monitor signal leakage over frequency and gain.

The resulting correction signal is sent along lead 309 to a sum/difference amplifier 310 where the correction signal is subtracted from the transmit signal sent to sum/difference amplifier 310 along lead 315. The resulting output of sum/difference amplifier 310 is sent along lead 105b to audio source 106 (FIGS. 1 and 2) as an echo-reduced transmit signal from headset or handset device 202. It is again noted that various forms of analog design and signal processing may be used, as will be evident to those of ordinary skill in the art. Furthermore, it is noted that if the human interface to audio input/output device 102 (FIG. 1) dramatically changes the transfer function of audio input/output device 102 (FIG. 1) in real-time, then the lack of analog adaptability may limit the available range of echo reduction in this example.

Although in the previous embodiments, a separate echo reduction apparatus 204 has been described, the invention is not limited to a separate apparatus. It will be apparent to those of ordinary skill in the art that the previously described echo reduction circuit, adaptive features, and user interface of echo reduction apparatus 204 may be incorporated into headset/handset 202 to effectively reduce echo.

Furthermore, while communication channels within FIGS. 1–3B have been referred to as leads, it should be understood that what are called leads can be buses capable of carrying a plurality of signals (either digital or analog as appropriate) in parallel or can even be wireless communication channels.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as falling within the true spirit and scope of this invention.

We claim:

1. An echo reduction apparatus, comprising:
   a first connection interface capable of operably coupling a headset or handset device to the echo reduction apparatus;
   a second connection interface capable of operably coupling an external audio source to the echo reduction apparatus; and
   an echo reduction circuit operably coupled to the first and second connection interfaces, wherein the echo reduction circuit includes a transfer function representing signal leakage characteristics specific to the headset or handset device, and further wherein the echo reduction circuit is capable of receiving a sound signal from the audio source, comparing the sound signal from the audio source to a sound signal from the headset or handset device, and providing an adjusted sound signal to the audio source.

2. The apparatus of claim 1, wherein the headset or handset device is external to the echo reduction apparatus.

3. The apparatus of claim 1, wherein the first connection interface is capable of operably coupling different headset or handset devices to the echo reduction circuit.

4. The apparatus of claim 1, wherein the audio source is selected from the group consisting of a communications network, a computer, a telephone, and a cellular telephone.

5. The apparatus of claim 1, wherein the sound signal from the audio source is delayed through a packet-switched network prior to being received by the echo reduction circuit.

6. The apparatus of claim 1, wherein the echo reduction circuit comprises a digital signal processor.

7. The apparatus of claim 1, wherein the echo reduction circuit comprises an analog-to-digital converter or a digital-to-analog converter.

8. The apparatus of claim 1, further comprising a gain control circuit operably coupled to the first and second connection interfaces.

9. The apparatus of claim 8, further comprising a user interface operably coupled to the gain control circuit to allow for volume control of the sound signal from the audio source.

10. An echo reduction system, comprising:
    an audio source that is capable of transmitting a sound signal;
    a headset or handset device operably coupled to the audio source, wherein the headset or handset device is capable of transmitting a sound signal; and
    an echo reduction apparatus operably coupled between the audio source and the headset or handset device, wherein the echo reduction apparatus comprises an echo reduction circuit including a transfer function representing signal leakage characteristics specific to the headset or handset device, the echo reduction circuit capable of receiving a sound signal from the audio source, comparing the sound signal from the audio source to a sound signal from the headset or handset device, and providing an adjusted sound signal to the audio source.

11. The system of claim 10, wherein the echo reduction apparatus is external to the audio source.

12. The system of claim 10, wherein the audio source is selected from the group consisting of a communications network, a computer, a telephone, and a cellular telephone.

13. The system of claim 10, wherein the sound signal transmitted from the audio source is delayed through a packet-switched network prior to being received by the echo reduction circuit.

14. The system of claim 10, wherein the headset or handset device may be selected from a plurality of headset or handset devices.

15. The system of claim 10, wherein the echo reduction apparatus flintier comprises a user interface to allow for volume control of the sound signal.

16. A method of reducing echo, comprising:
    providing an echo reduction circuit operably coupled between a headset or handset device and an audio source;
    transmitting a sound signal from the audio source to the echo reduction circuit;

comparing the sound signal from the audio source to a sound signal from the headset or handset device;

adjusting the sound signal from the headset or handset device as necessary wherein the sound signal is adjusted by a transfer function representing signal leakage characteristics specific to the headset or handset device; and transmitting the adjusted sound signal to the audio source.

17. The method of claim 16, wherein the sound signal from the audio source is delayed through a packet-switched network prior to being received by the echo reduction circuit.

18. The method of claim 16, wherein the headset or handset device may be selected from a plurality of headset or handset devices.

19. The method of claim 16, wherein comparing the sound signal from the audio source to the sound signal from the headset or handset device is performed by a digital signal processor.

* * * * *

UNITED STATES PATENT AND TRADEMARK OFFICE
CERTIFICATE OF CORRECTION

| | | |
|---|---|---|
| PATENT NO. | : 7,039,179 B1 | Page 1 of 1 |
| APPLICATION NO. | : 10/256450 | |
| DATED | : May 2, 2006 | |
| INVENTOR(S) | : John F. Gerhardt et al. | |

It is certified that error appears in the above-identified patent and that said Letters Patent is hereby corrected as shown below:

In the Claims

Claim 15, column 8, line 60, replace "flintier" with --further--.

Signed and Sealed this
Tenth Day of February, 2015

Michelle K. Lee
*Deputy Director of the United States Patent and Trademark Office*